United States Patent [19]

Ware

[11] Patent Number: 4,545,028

[45] Date of Patent: Oct. 1, 1985

[54] PARTIAL PRODUCT ACCUMULATION IN HIGH PERFORMANCE MULTIPLIERS

[75] Inventor: Frederick A. Ware, Los Altos Hills, Calif.

[73] Assignee: Hewlett-Packard Company, Palo Alto, Calif.

[21] Appl. No.: 434,298

[22] Filed: Oct. 13, 1982

[51] Int. Cl.[4] ............................................. G06F 7/52
[52] U.S. Cl. ................................................. 364/760
[58] Field of Search .............................. 364/760, 759

[56] References Cited

U.S. PATENT DOCUMENTS 4,153,938  5/1979  Chest et al. ...................... 364/760

OTHER PUBLICATIONS

Waser, "High-Speed Monolithic Multipliers for Real-Time Digital Signal Processing", *Computer*, Oct. 1978, pp. 19-29.
Goshing et al., "Uncommitted Logic Array which Provides Cost-Effective Multiplication Even for Long Words", *Computers & Digital Techniques*, Jun. 1979, vol. 2, No. 3, pp. 113-120.
Andrew D. Booth, "A Signed Binary Multiplication Technique", Quarterly Journ. Mech. and Applied Math., vol. IV, Pt. 2 (1951), pp. 236-240.
C. S. Wallace, "A Suggestion for a Fast Multiplier", IEEE Transactions on Electronic Computers, pp. 14-17 (Feb. 1964).

*Primary Examiner*—David H. Malzahn
*Attorney, Agent, or Firm*—Jeffery B. Fromm

[57] ABSTRACT

A new technique for the accumulation of partial product terms in a monolithic VLSI multiplier is disclosed. The method requires fewer than a 5% increase in transistors over older techniques yet provides more than three times the performance of the prior art when used to implement a 64×64 multiplier. The accumulator is implemented with one-bit cells to facilitate the VLSI mask design and is expandable to any desired precision.

13 Claims, 14 Drawing Figures

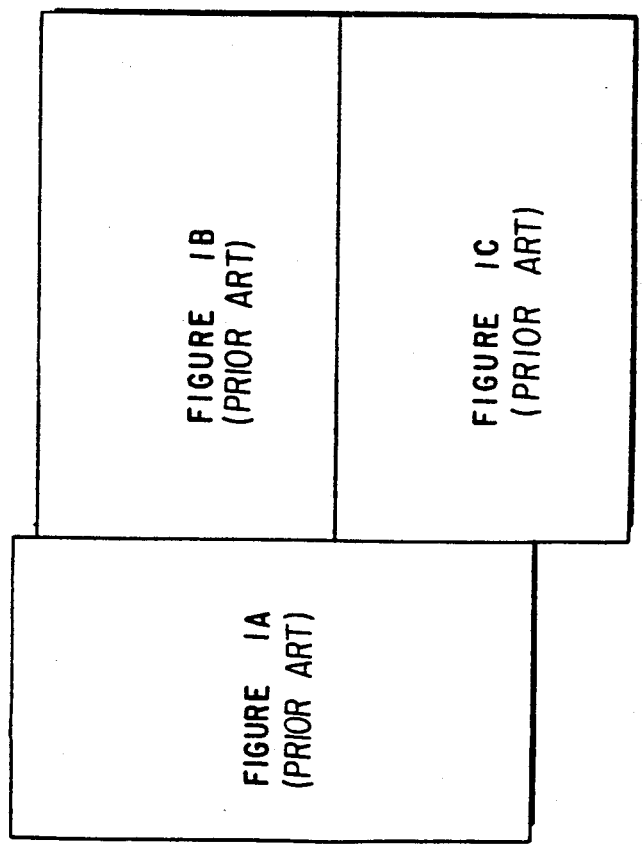

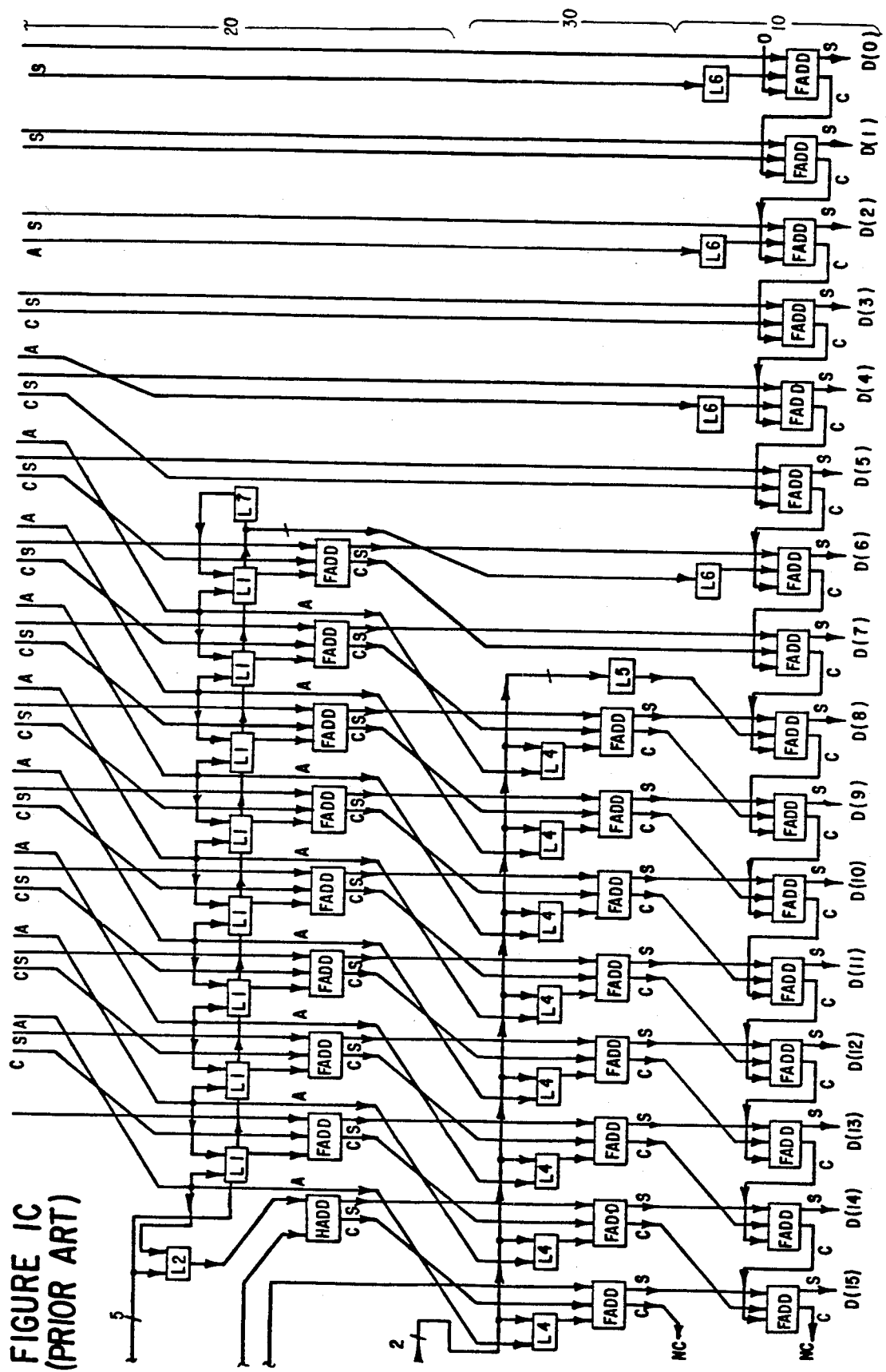
FIGURE IC (PRIOR ART)

CELL 1

CELL 3

CELL 2

CELL 4

CELL 5

CELL 7

CELL 6

CELL 8

PARTIAL PRODUCT ACCUMULATION IN HIGH PERFORMANCE MULTIPLIERS

BACKGROUND OF THE INVENTION

The multiplication of two N-bit operands is a fundamental operation in general purpose computer processors. To perform a longhand multiplication the first operand A is successively multiplied by each bit of the second operand B to create a partial product. The partial product is then shifted to assign the appropriate weight based on the weight of the corresponding digit of the second operand B. Finally, the shifted partial products are added together, i.e., accumulated, to form the final product D.

Several techniques have been devised to speed up and/or simplify the longhand multiplication described above. Usually, as explained by A. Booth, in "A Signed Binary Multiplication Technique", Quarterly Journal of Mechanics and Applied Mathematics, Vol. IV, pt. 2, pp. 236–240 (1951), an encoding scheme is performed on the bits of the B operand by means of a signed-digit-carry set (SDC) of, for example, +2, +1, 0, −1, and −2, to reduce the number of partial products to be accumulated by one-half. The accumulation is then performed in a ripple fashion through the use of full adders arranged in a carry save format. Each partial product bit still requires one full adder.

A complete 8×8 encoded binary multiplier is shown in FIG. 1 with the related Boolean equations in Table 1. FIG. 1 consists of four sections; encoder logic 10, ripple accumulator 20, negative B operand correction 30, and a carry propagate adder 40.

TABLE 1

L1 LOGIC

L1(K,J) = [XP2(J) * A(K−1)] + [XP1(J) * A(K)] + [XM1(J) * $\overline{A}$(K)] + [XM2(J) * $\overline{A}$(K−1)]

L2 LOGIC

L2(2J) = [XP2(J) * A(7)] + [XM2(J) * $\overline{A}$(7)]

L3 LOGIC

NEGA = TCA * A(7)

P = [XM2(J) * $\overline{NEGA}$] + [XP2(J) * NEGA]

Q = [XM1(J) * $\overline{NEGA}$] + [XP1(J) * NEGA]

BIT(2J+1) = MINUS(J) XDR P] + [$\overline{MINUS}$ (J) * Q]

BIT(2J) = MINUS(J) XDR Q

MINUS(J+1) = MINUS(J) + P + Q

L4,L5,L6,L7 LOGIC

NEGB = TCB * B7

L4(K) = [NEGB XDR SDC(B)] * [NEGB XDR A(K)]

L5 = NEGB * $\overline{SDC(B)}$

L5(J) = XM1(J) + XM2(J)

L7(J) = A(−1) = ∅

The operands are A(0-7) and B(0-7) and the product is D(0-15). HADD and FADD are conventional half adders and full adders respectively with carry (C) and sum (S) ouputs.

The inputs TCA and TCB indicate whether the A and B operands are two's complement (=1) or unsigned (=0). The symbols XP2, XP1, X0, XM1, and XM2 are used for the X(+2), X(+1), X(0), X(−1), and X(−2) encoded digits for clarity. "*" is the Boolean "AND", "+" is the Boolean "OR", and "XOR" is the Boolean "Exclusive-OR".

In Table 1, logic block L1 consists of logic to select X(+2), X(+1), X(0), X(−2) multiples of the A operand. The multiples of B are generated in the array by simple shifting, complementing, or masking operations. The L2 block generates the lost bit that results from the single shift used to generate an X(+2) or X(−2) multiple.

TABLE 2

| B(2J+1) | B(2J) | SDC(2J) | MULTIPLIER | SDC(2J+2) |
|---|---|---|---|---|
| ∅ | ∅ | ∅ | X∅ | ∅ |
| ∅ | ∅ | 1 | XP1 | ∅ |
| ∅ | 1 | ∅ | XP1 | ∅ |
| ∅ | 1 | 1 | XP2 | ∅ |
| 1 | ∅ | ∅ | XM2 | 1 |
| 1 | ∅ | 1 | XM1 | 1 |
| 1 | 1 | ∅ | XM1 | 1 |
| 1 | 1 | 1 | X∅ | 1 |

Logic block L3 incorporates the signed digit encoding set of Table 2 as proposed by Booth. Block L3 also performs an effective sign extension of each partial product to 16 bits. The signal Minus(J) indicates that at least one previous bit pair generated a negative partial product. This signal is combined with the signed digit multiplier of a bit pair to generate bit (2J) and bit (2J+1). These two signals are the effective sign extension for each partial product fully merged with the sign extensions of all previously generated partial products. Logic blocks L4 and L5 perform a correction for a negative B operand and for a signed digit carry out of the last multiplier bit pair. Blocks L6 and L7 perform a two's complement operation on the A operand for X(−1) and X(−2) signed digits.

The advantage of this ripple adder technique is that it is usually convenient to lay out the required circuitry in monolithic single chip form. However, this technique is generally quite slow because the partial product accumulation takes place in ripple fashion, and the worst case delay path must pass through all of the rows of full adders. For example, in the case of the 8×8 multiplier with encoding as shown in FIG. 1 which will have four 8-bit partial products, the worst case delay will be equivalent to four full adder delays. Without encoding, the worst case delay would be eight full adder delays. In the case of a 64×64 multiplier with encoding, the worst case delay would be thirty-two, and without encoding the maximum delay would be sixty-four full adder delays.

SUMMARY OF THE INVENTION

The present invention replaces the standard ripple accumulator 20 described in FIG. 1. This new technique requires fewer than 5% more transistors to implement than the prior art shown in FIG. 1 yet is able to provide more than three times the performance of the prior technique for a 64×64 multiplier. Thus, rather than 32 full adder delays, the present invention can perform a 64×64 multiply with only 10 full adder delays. This compares favorably with the theoretical minimum delay of 8 full adders as explained by C. S. Wallace in "A Suggestion for a Fast Multiplier", IEEE Transactions on Electronic Computers, pp. 14–17 (February 1964).

The new technique involves breaking the rows of the accumulator array into blocks. The blocks themselves are of varying length and are implemented as a series of one-bit ripple cells. To implement a multiplier of any desired precision only eight different cell types are required for the entire accumulator. The accumulation of the blocks still occurs in ripple fashion, but the ripple of the blocks occurs in parallel. The number of cells per block is arranged as an arithmetic progression to match the desired precision of the multiplication with the result that after the local ripple of the first block, each additional block requires only two more full adder delays.

Thus, the present technique can be used to provide for the accumulation of partial product terms in a high precision, high performance multiplier. The method is easily expandable to any desired precision. It is especially suited for utilization in a monolithic VLSI multiplier because of its high speed, low complexity, and straight forward mask design.

Generally, the present technique will be implemented in a multiplier which employs some form of encoding, as described earlier, since encoding can reduce the size of the accumulator by one-half, while the encoding itself usually requires only simple logic gates or multiplexors. However, the disclosed technique is a general method of accumulation and will function in a system which does not utilize encoding at all.

DETAILED DESCRIPTION OF THE DRAWINGS

FIGS. 1' and 1A–1C show a complete 8×8 bit encoded binary multiplier according to the prior art. FIGS. 2A–2H show the set of cells required to implement the accumulation technique of the present invention.

DETAILED DESCRIPTION OF THE INVENTION

Figures 3, 4:
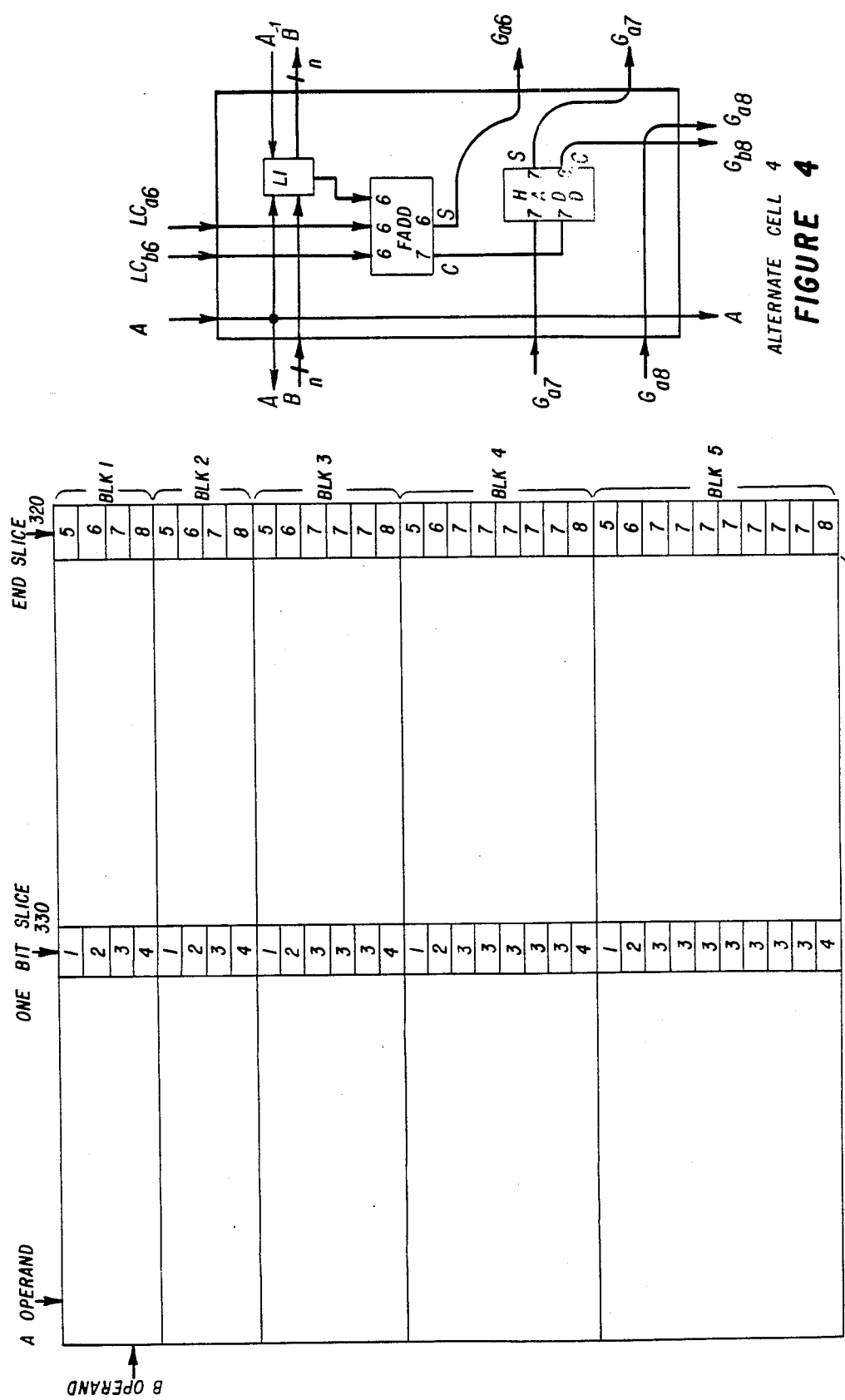
FIG. 3 shows the organization of the cells of FIGS. 2A–2H into blocks to form a 64×64 bit accumulator with encoded B inputs.
FIG. 4 shows a modified version of the cell of FIG. 2D to attain the minimum circuit delay.

FIGS. 2A–2H show the complete set of cells necessary to implement the present digital accumulator. Shown are cells 1–8, respectively, which are organized, for example, as shown in FIG. 3 to form a 64×64 bit memory array which can replace the ripple accumulator array 20 of the type shown in FIG. 1. Cells 1–4 are used in the main array 310 of FIG. 3. Each cell is one bit by one bit in area, thus requiring a main array 310 of 64×32 cells in the example shown in FIG. 3 where encoding is assumed. The logic elements surrounding the main array 310 (encoder logic 10, negative operand correction 30, and the carry propagate adder 40 shown in FIG. 1) are unchanged except for a single column 320 of end cells 5–8 which are also one bit in area as shown in FIGS. 2E–2H respectively, on the right side of array 310. The logic element L1 used in cells 1–4 and logic element L6 used in cells 5–8 are the same elements as used in the prior art as illustrated in Table 1. The full adders FADD are also of convention design as used in the prior art.

As shown in FIG. 3, the accumulation technique involves breaking the rows of the matrix array 310 with end slice 310 into blocks. In the 64 bit example shown, the 32 rows of partial product blocks are broken into five blocks 1–5 of height 4, 4, 6, 8, and 10 bit rows. Each row is coupled to one pair of encoded B operand bits. In addition the matrix array 310 is composed of 64 columns of cells as shown by bit slice 330. Each slice 330 is coupled to one bit of the A operand.

Each slice 330 of blocks 1–5 in the main array 310 is implemented as a cell 1, followed by a cell 2, followed by one or more of continue cells 3, and finished by a cell 4. Similarly, the end cell slice 320 of each block 1–5 is implemented as a cell 5, followed by a cell 6, followed by one or more of cells 7, and finished by a cell 8. Each block 1–5 performs a local ripple accumulation of its partial product terms, labeled as $LC_a$, and $LC_b$, with a relative weight depending on the corresponding row position of the cell involved. For example, $LC_{a5}$ is a local ripple term with a relative bit weight of 5.

The ripple accumulation of the blocks 1–5 is accomplished by the global ripple terms $G_a$ and $G_b$, and occurs in parallel. The length of the blocks 1–5 is selected to form an arithmetic progression, for example, 4-4-6-8-10 as illustrated in FIG. 3, which matches the number of partial products required. An ideal progression would be of the form 1-2-3-4-5, but the sum of the lengths must match the number of partial products and the technique requires four rows in the first block as explained above. Thus a progression of 4-6-6 would best match an accumulator with sixteen partial products and 4-4-6-8-10 effectively matches a system with 32 partial products. The result of arranging the length of blocks to form an arithmetic progression is that as block 1 finishes rippling, its terms are ready to be accumulated into the two global bits $G_a$ and $G_b$ along with the output terms of block 2. The output terms of block 2 then pass down the array 310 and end slice 320 and are accumulated with the local bits $LC_a$ and $LC_b$ of block 3, and so on. The result is that after block 1, each additional block requires only two more full adder delays.

As each local bit $LC_a$ or $LC_b$ or global bit $G_a$ and $G_b$ is passed down the array 310 with 320 from one row to the next, it must be shifted two bits to the right in order to be assigned the proper bit weight. This is the reason for the additional full adders in cells 5–8 in the end slice 320. The result is that the total number of intermediate product terms $P_a$ and $P_b$ is reduced to two terms per bit so that the intermediate product terms $P_a$ and $P_b$ may then pass on to a conventional carry propagate adder 40 (FIG. 1), which adder 40 produces the final multiplier product bits D.

Figure 1A:
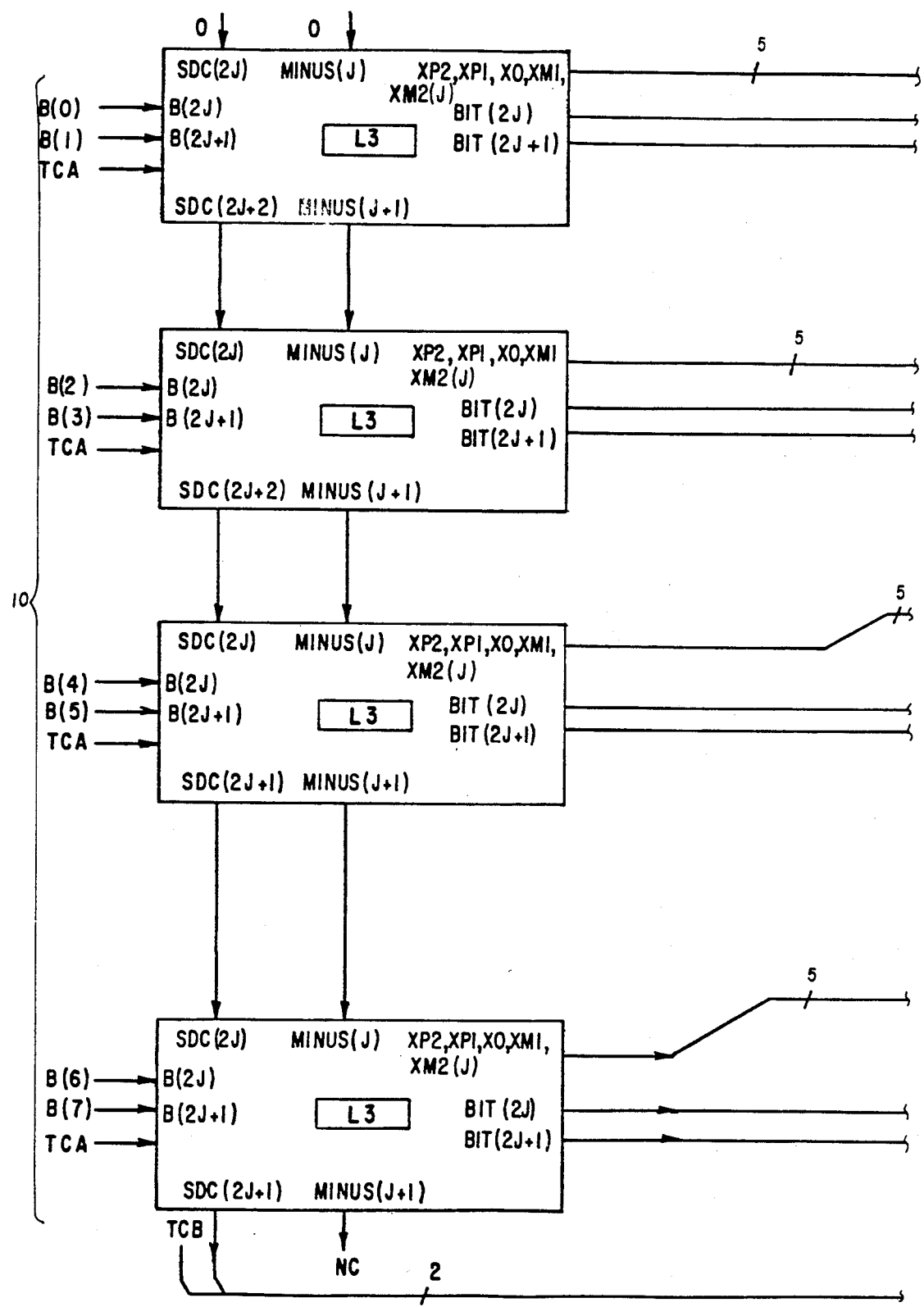
Figure 1B:
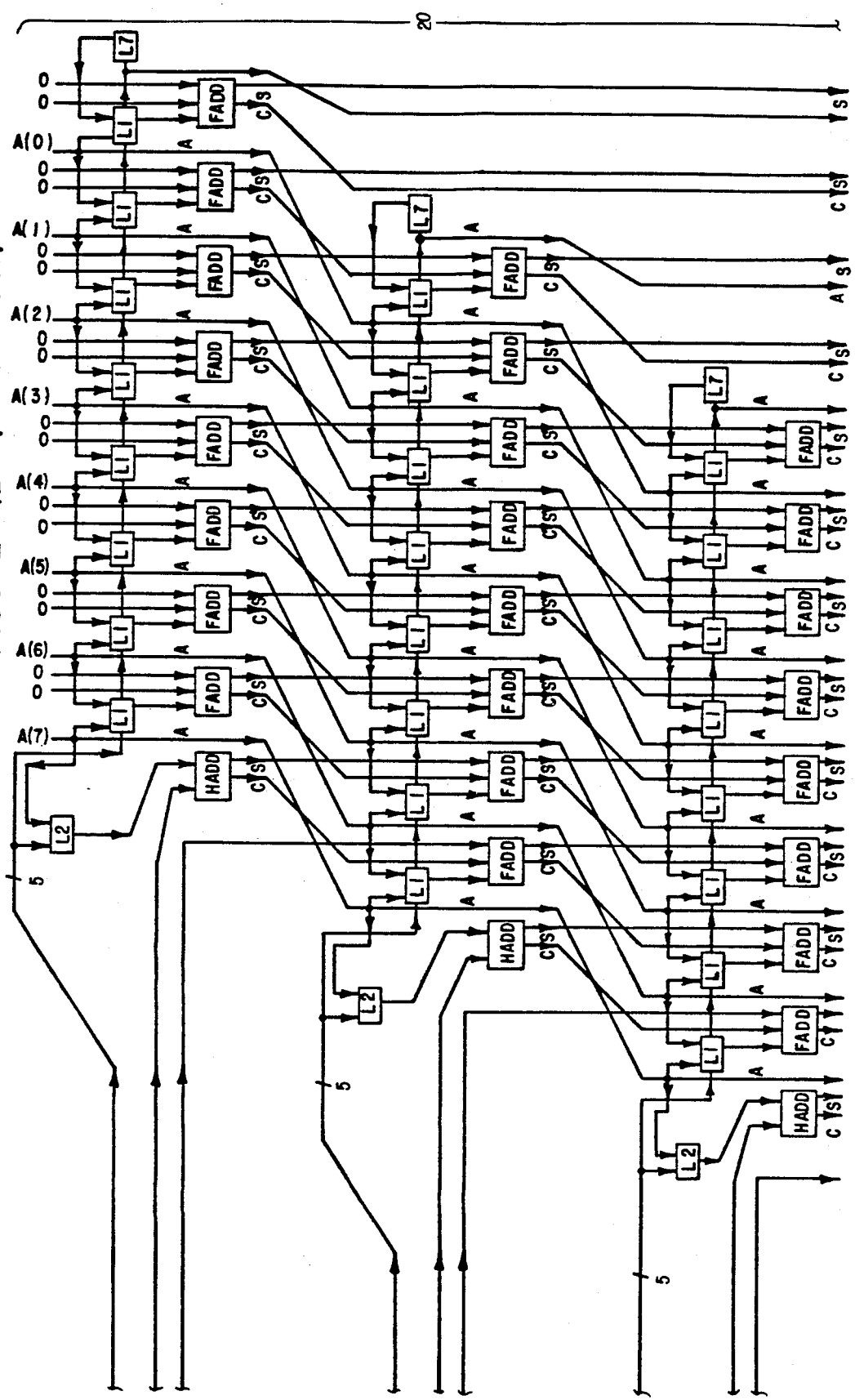
Figure 2A:
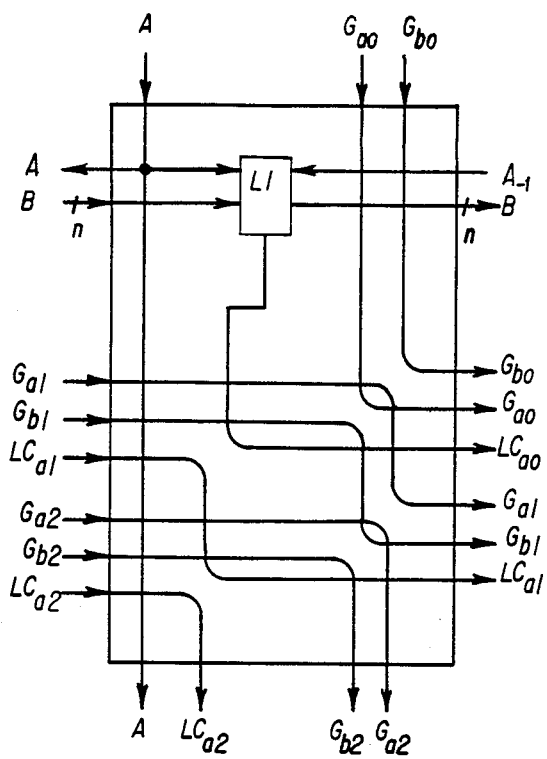
Figure 2C:
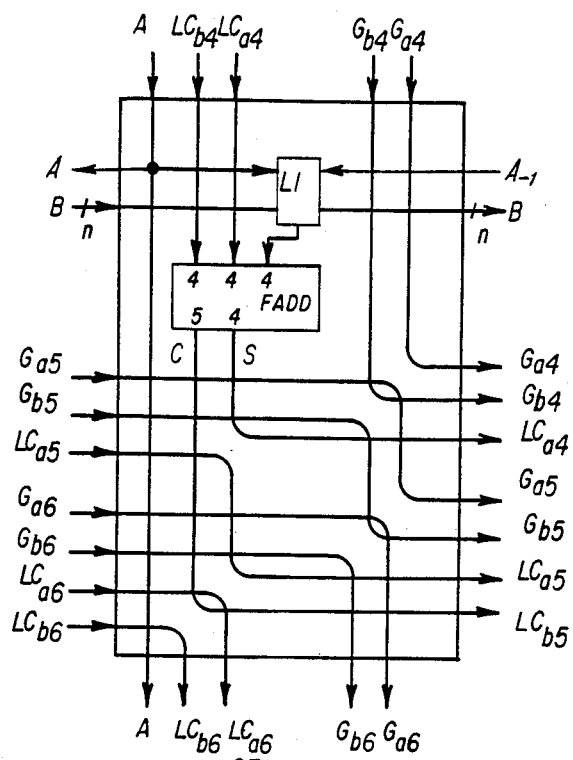
Figure 2B:
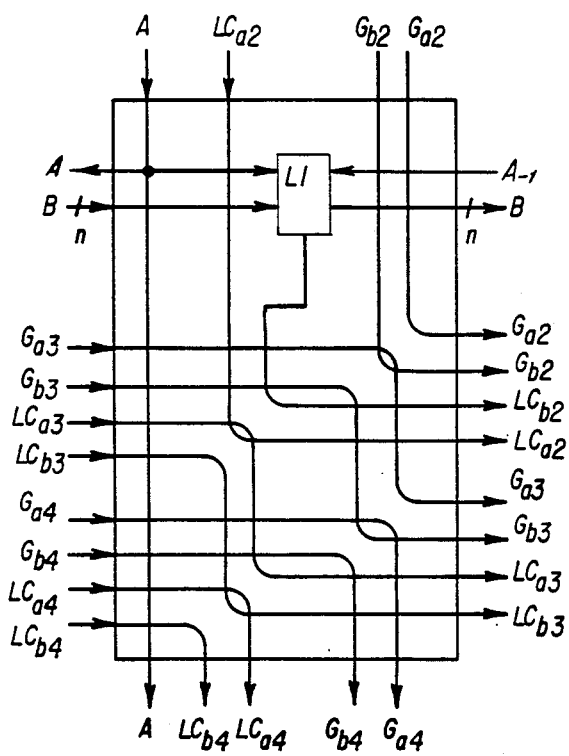
Figure 2D:
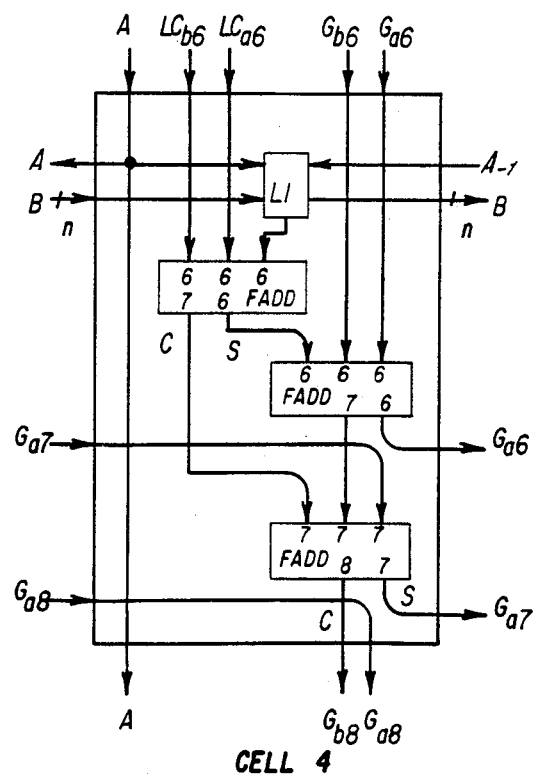
Figure 2E:
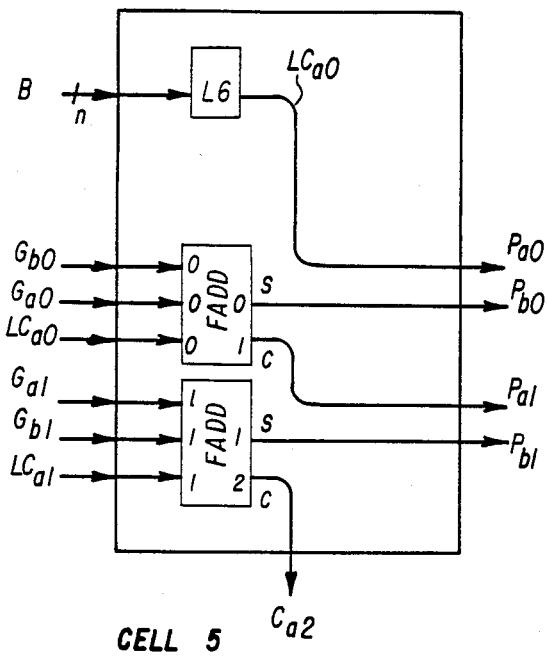
Figure 2G:
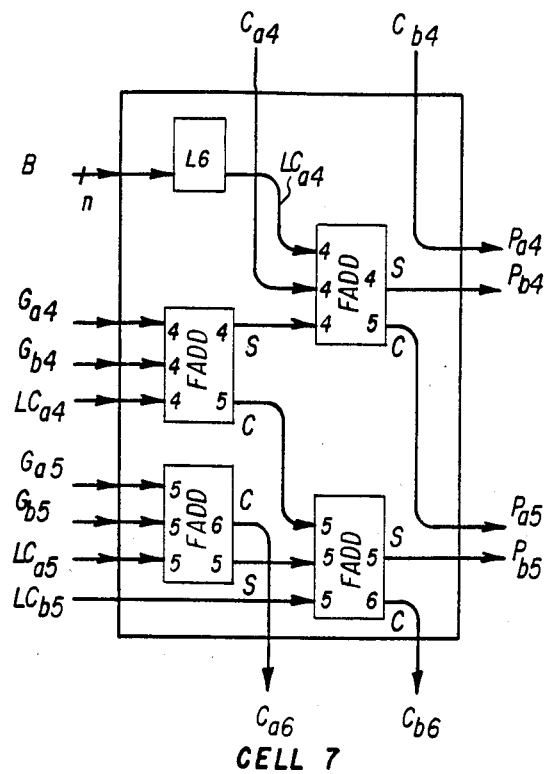
Figure 2F:
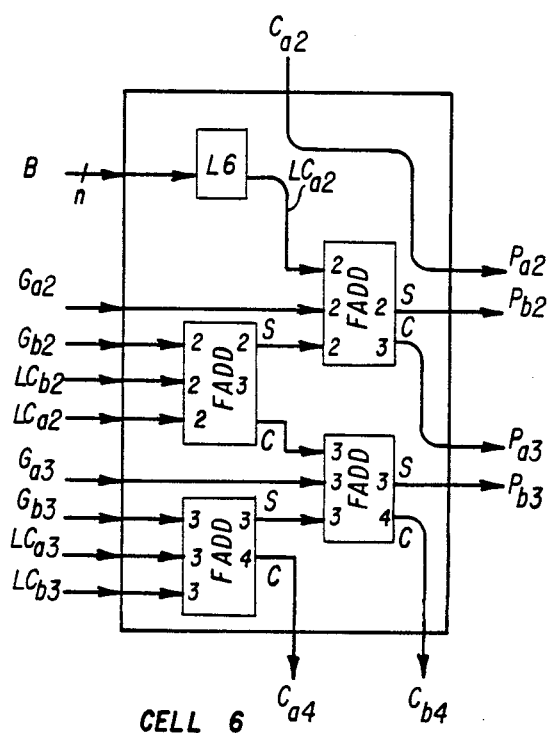
Figure 2H:
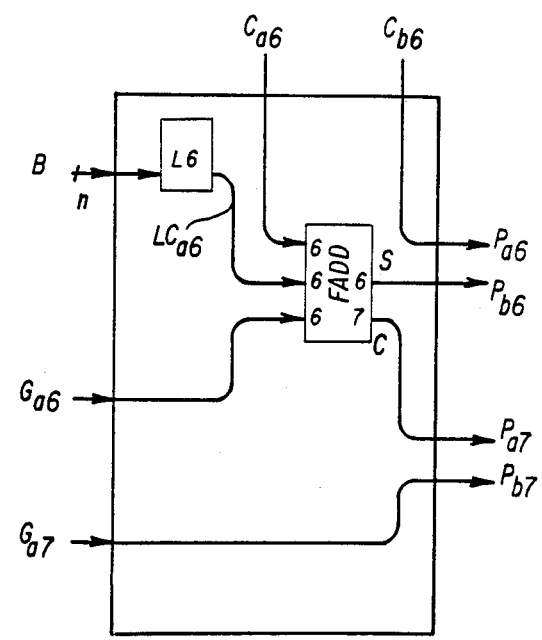

Since the first global bits $G_a$ and $G_b$ on the top row of the main array 310 are all zero, as shown in FIG. 1, cell 4 of block 1 may be modified as shown in FIG. 4 to remove the logically redundant full adders in that cell to attain the minimum overall delay in the entire array 310.

I claim:
1. A circuit for accumulating partial products in a multiplier of first and second multiple-bit operands, said accumulator circuit comprising:
   a first block of ripple cells arranged as
      a first row of first ripple cells coupled to a digit of both said first and second operands for producing first local ripple signals, said first row of first ripple cells terminated by a first end ripple cell coupled to said second operand for producing a first partial product signal, a second row of second ripple cells coupled to a digit of both said first and second operands and to said first local ripple signals for producing second local ripple signals, said second row of second ripple cells terminated by a second ripple end cell coupled to said second operand for producing a second partial product signal, at least one row of third ripple cells, each row of third ripple cells coupled to a digit of both said first and second operands, the first of said at least one row of third ripple cells coupled to said second local ripple signals for producing a first set of third local ripple signals and subsequent ones of the rows of third ripple cells coupled to the local ripple signals of the next proceeding row of third ripple cells for producing subsequent sets of third local ripple signals, each of said at least one row of third ripple cells terminated by a third ripple end cell coupled to the second operand for producing a third partial product signal, and a fourth row of fourth ripple cells coupled to a digit of both said first and second operands and to the last set of third local ripple signals for producing first global ripple signals, said fourth row of fourth ripple cells terminated by a fourth ripple end cell coupled to the second operand for producing a fourth partial product signal; and a second block of ripple cells arranged as a fifth row of fith ripple cells coupled to a digit of both said first and second operands and to the first global ripple signals of the first block of ripple cells for producing fifth local ripple signals, said fifth row of fifth ripple cells terminated by a first end ripple cell coupled to said second operand for producing a fifth partial product signal, a sixth row of second ripple cells coupled to a digit of both said first and second operands and to said fifth local ripple signals for producing sixth local ripple signals, said sixth row of second ripple cells terminated by a second ripple end cell coupled to said second operand for producing a sixth partial product signal, at least one row of third ripple cells, each row of third ripple cells coupled to a digit of both said first and second operands, the first of said at least one row of third ripple cells coupled to said sixth local ripple signals for producing a first set of seventh local ripple signals and subsequent ones of the rows of third ripple cells coupled to the local ripple signals of the next proceeding row of third ripple cells for producing subsequent sets of third local ripple signals, each of said at least one row of third ripple cells terminated by a third ripple end cell coupled to the second operand for producing a seventh partial product signal, and an eight row of fourth ripple cells coupled to a digit of both said first and second operands and to the last set of seventh local ripple signals for producing second global ripple signals, said eighth row of fourth ripple cells terminated by a fourth ripple end cell coupled to the second operand for producing an eighth partial product signal.

2. A circuit as in claim 1 wherein the first and fifth ripple cells are identical.

3. A circuit as in claim 1 further comprising a third block of ripple cells arranged as a ninth row of fifth ripple cells coupled to a digit of both said first and second operands and to the second global ripple signals of the second block of ripple cells for producing ninth local ripple signals, said ninth row of fifth ripple cells terminated by a first end ripple cell coupled to said second operand for producing a ninth partial product signal, a tenth row of second ripple cells coupled to a digit of both said first and second operands and to said ninth local ripple signals for producing tenth local ripple signals, said tenth row of second ripple cells terminated by a second ripple end cell coupled to said second operand for producing a tenth partial product signal, at least one row of third ripple cells, each row of third ripple cells coupled to a digit of both said first and second operands, the first of said at least one row of third ripple cells coupled to said tenth local ripple signals for producing a first set of eleventh local ripple signals and subsequent one of the rows of third ripple cells coupled to the local ripple signals of the next proceeding row of third ripple cells for producing subsequent sets of third local ripple signals, each of said at least one row of third ripple cells terminated by a third ripple end cell coupled to the second operand for producing an eleventh partial product signal, and a twelfth row of fourth ripple cells coupled to a digit of both said first and second operands and to the last set of eleventh local ripple signals for producing third global ripple signals, said twelfth row of fourth ripple cells terminated by a fourth ripple end cell coupled to the second operand for producing a twelfth partial product signal.

4. A circuit as in claim 3 wherein the first and fifth ripple cells are identical.

5. A circuit as in claim 3 wherein the number of rows of ripple cells in the first block is A, the number of rows of ripple cells in the second block is B, the number of rows of ripple cells in the third block is C, and the numbers A, B and C form an arithmetic progression.

6. A circuit for accumulating partial products in a multiplier for first and second multiple-bit operands wherein said second multiple-bit operand is encoded into a set of encoded second operand digits, said accumulator circuit comprising:

a first block of ripple cells arranged as a first row of first ripple cells coupled to a digit of said first operand and to one of the encoded second operand digits for producing first local ripple signals, said first row of first ripple cells terminated by a first end ripple cell coupled to said encoded second operand for producing a first partial product signal, a second row of second ripple cells coupled to a digit of said first operand, to one of the encoded second operand digits and to said first local ripple signals for producing second local ripple signals, said second row of second ripple cells terminated by a second ripple end cell coupled to said second encoded operand for producing a second partial product signal, at least one row of third ripple cells, each row of third ripple cells coupled to a digit of said first operand and to one of the encoded second operand digits, the first of said at least one row of third ripple cells coupled to said second local ripple signals for producing a first set of third local ripple signals and subsequent ones of the rows of third ripple cells coupled to the local ripple signals of the next proceeding row of third ripple cells for producing subsequent sets of third local ripple signals, each of said at least one row of third ripple cells terminated by a third ripple end cell coupled to the second encoded operand for producing a third partial product signal, and a fourth row of fourth ripple cells coupled to a digit of said first operand, to one of the encoded second operand digits and to the last set of third local ripple signals for producing first global ripple signals, said fourth row of fourth ripple cells terminated by a fourth ripple end cell coupled to the second encoded operand for producing a fourth partial product signal; and a second block of ripple cells arranged as a fifth row of fifth ripple cells coupled to a digit of said first operand, to one of the encoded second operand digits and to the first global ripple signals of the first block of ripple cells for producing fifth local ripple signals, said fifth row of fifth ripple cells terminated by a first end ripple cell coupled to said second encoded operand for producing a fifth partial product signal, a sixth row of second ripple cells coupled to a digit of said first operand, to one of the encoded second operand digits and to said fifth local ripple signals for producing sixth local ripple signals, said sixth row of second ripple cells terminated by a second ripple end cell coupled to said second encoded operand for producing a sixth partial product signal, at least one row of third ripple cells, each row of third ripple cells coupled to a digit of said first operand and to one of the encoded second operand digits, the first of said at least one row of third ripple cells coupled to said sixth local ripple signals for producing a first set of seventh local ripple signals and subsequent ones of the rows of third ripple cells coupled to the local ripple signals of the next proceeding row of third ripple cells for producing subsequent sets of third local ripple signals, each of said at least one row of third ripple cells terminated by a third ripple end cell coupled to the second encoded operand for producing a seventh partial product signal, and an eight row of fourth ripple cells coupled to a digit of said first operand, to one of the encoded second operand digits and to the last set of seventh local ripple signals for producing second global ripple signals, said eight row of fourth ripple cells terminated by a fourth ripple end cell coupled to the second encoded operand for producing an eighth partial product signal.

7. A circuit as in claim 6 wherein the first and fifth ripple cells are identical.

8. A circuit as in claim 6 further comprising a third block of ripple cells arranged as a ninth row of fifth ripple cells coupled to a digit of said first operand, to one of the encoded second operand digits and to the second global ripple signals of the second block of ripple cells for producing ninth local ripple signals, said ninth row of fifth ripple cells terminated by a first end ripple cell coupled to said second encoded operand for producing a ninth partial product signal, a tenth row of second ripple cells coupled to a digit of said first operand, to one of the encoded second operand digits and to said ninth local ripple signals for producing tenth local ripple signals, said tenth row of second ripple cells terminated by a second ripple end cell coupled to said second encoded operand for producing a tenth partial product signal, at least one row of third ripple cells, each row of third ripple cells coupled to a digit of said first operand and to one of the encoded second operand digits, the first of said at least one row of third ripple cells coupled to said tenth local ripple signals for producing a first set of eleventh local ripple signals and subsequent ones of the rows of third ripple cells coupled to the local ripple signals of the next proceeding row of third ripple cells for producing subsequent sets of third local ripple signals, each of said at least one row of third ripple cells terminated by a third ripple end cell coupled to the second encoded operand for producing an eleventh partial product signal, and a twelfth row of fourth ripple cells coupled to a digit of said first operand, to one of the encoded second operand digits and to the last set of eleventh local ripple signals for producing third global ripple signals, said twelfth row of fourth ripple cells terminated by a fourth ripple end cell coupled to the second encoded operand for producing a twelfth partial product signal.

9. A circuit as in claim 8 wherein the first and fifth ripple cells are identical.

10. A circuit as in claim 8 wherein the number of rows of ripple cells in the first block is A, the number of rows of ripple cells in the second block is B, the number of rows of ripple cells in the third block is C, and the numbers A, B and C form an arithmetic progression.

11. A circuit for accumulating partial products in a multiplier of first and second multiple-bit operands, said accumulator circuit comprising:

a plurality of blocks of ripple cells coupled to the first and second multiple-bit operands, each of said plurality of blocks arranged as one row of first ripple cells, one row of second ripple cells coupled to the one row of first ripple cells, at least one row of third ripple cells, the first of said at least one row of ripple cells coupled to the one row of second ripple cells and subsequent ones of the rows of third ripple cells coupled to the next preceding row of third ripple cells, and one row of fourth ripple cells coupled to the last of the at least one row of third ripple cells, to provide local ripple signals between each row of ripple cells within each block and to provide global ripple signals between each of the plurality of blocks.

12. A circuit as in claim 11 wherein the number of rows of ripple cells in each of the plurality of blocks of ripple cells forms an arithmetic progression.

13. A circuit as in claim 11 further comprising:

one first ripple end cell terminating each row of first ripple cells within each block for producing a first partial product signal;

one second ripple end cell terminating each row of second ripple cells within each block for producing a second partial product signal;

one third ripple end cell terminating each row of third ripple cells within each block for producing a third partial product signal; and one fourth ripple end cell terminating each row of fourth ripple cells within each block for producing a fourth partial product signal.

* * * * *

UNITED STATES PATENT AND TRADEMARK OFFICE
CERTIFICATE OF CORRECTION

PATENT NO. : 4,545,028

DATED : October 1, 1985

INVENTOR(S) : Frederick A. Ware

It is certified that error appears in the above-identified patent and that said Letters Patent is hereby corrected as shown below:

Column 1, line 32, "FIG. 1 consists of four sections;" should read
-- FIG. 1 consists of four sections: --

Column 1, line 51, "=MINUS(J) XDR P] + " should read
-- =[MINUS(J) XDR P] + --

Column 1, line 59, "= [NEGB XDR SDC(B)]*" should read
-- = [NEGB XDR SDC(8)]* --

Column 1, line 61, "= NEGB * $\overline{SDC(B)}$" should read
-- = NEGB * $\overline{SDC(8)}$ --

Column 1, line 63, "L5(J)" should read
-- L6(J) --

Column 2, line 11, "X(+2), X(+1), X(0), X(-2) multiples" should read
-- X(+2), X(+1), X(0), X(-1), or X(-2) multiples --.

Column 4, line 3, "end slice 310 into blocks." should read
-- end slice 320 into blocks. --

Column 4, line 13, "4, Similarly, the end cell slice 320" should read
-- 4. Similarly, the end cell slice 320 --

Column 5, line 32, "a fifth row of fith ripple cells" should read
-- a fifth row of fifth ripple cells --

Column 5, line 62, "an eight row of fourth ripple cells" should read
-- an eighth row of fourth ripple cells --

Column 6, line 47, "multiplier for first and second" should read
-- multiplier of first and second

UNITED STATES PATENT AND TRADEMARK OFFICE
CERTIFICATE OF CORRECTION

PATENT NO. : 4,545,028

DATED : October 1, 1985

INVENTOR(S) : Frederick A. Ware

It is certified that error appears in the above-identified patent and that said Letters Patent is hereby corrected as shown below:

Column 7, line 54, "an eight row of fourth ripple cells" should read
-- an eighth row of fourth ripple cells --

Column 7, line 58, "ripple signals, said eight row" should read
-- ripple signals, said eighth row --

Signed and Sealed this

Eighteenth Day of February 1986

[SEAL]

Attest:

DONALD J. QUIGG

Attesting Officer

Commissioner of Patents and Trademarks